(12) United States Patent
Van Stam

(10) Patent No.: US 9,055,197 B2
(45) Date of Patent: Jun. 9, 2015

(54) INTELLIGENT PEER-TO-PEER SYSTEM AND METHOD FOR COLLABORATIVE SUGGESTIONS AND PROPAGATION OF MEDIA

(75) Inventor: Wijnand J. Van Stam, Sunnyvale, CA (US)

(73) Assignee: TiVo Inc., Alviso, CA (US)

( * ) Notice: Subject to any disclaimer, the term of this patent is extended or adjusted under 35 U.S.C. 154(b) by 72 days.

(21) Appl. No.: 13/244,476

(22) Filed: Sep. 25, 2011

(65) Prior Publication Data

US 2012/0016934 A1    Jan. 19, 2012

Related U.S. Application Data

(63) Continuation of application No. 10/168,782, filed as application No. PCT/US00/35035 on Dec. 21, 2000, now Pat. No. 8,132,219.

(60) Provisional application No. 60/171,829, filed on Dec. 21, 1999, provisional application No. 60/226,856, filed on Aug. 22, 2000.

(51) Int. Cl.
     *H04N 7/10*            (2006.01)
     *G06F 15/16*           (2006.01)
                 (Continued)

(52) U.S. Cl.
CPC ........... *H04N 7/17336* (2013.01); *H04H 60/35* (2013.01); *H04N 21/442* (2013.01); *G06F 17/30029* (2013.01); *G06F 17/30035* (2013.01); *G06F 17/30206* (2013.01); *G06F 17/30699* (2013.01); *G11B 27/105* (2013.01); *G11B 27/34* (2013.01); *G11B 2220/20* (2013.01); *H04N 5/44513* (2013.01); *H04N 5/44543* (2013.01);

(Continued)

(58) Field of Classification Search
USPC ............................................. 725/34; 709/203
See application file for complete search history.

(56) References Cited

U.S. PATENT DOCUMENTS 4,996,642 A *   2/1991   Hey ............................ 705/7.29
5,410,344 A      4/1995   Graves et al.

(Continued)

FOREIGN PATENT DOCUMENTS

EP          0 854 645 A2     7/1998
WO     WO 99/35830 A1    7/1999

OTHER PUBLICATIONS

XP-002154116, Metabye Announces Personalized TV Software, www.mbtv.com.

(Continued)

*Primary Examiner* — Pankaj Kumar
*Assistant Examiner* — Franklin Andramuno
(74) *Attorney, Agent, or Firm* — Wong & Rees LLP

(57) ABSTRACT

In a network-based system for recommending media content items based on user preferences, clients contact a server on a periodic basis, independent of the user. In addition to client-server interaction, clients also interact with one another in peer-to-peer fashion. Peers query one another and evaluate their similarity to each other in an interactive comparison of user preferences. When two clients are sufficiently similar, the interaction culminates in the originating client downloading content listings from the targeted peer to generate suggestions for their user. If the two clients are dissimilar, the query may be terminated, or the targeted peer may route the query to a second targeted peer. In addition to the lists of preferences, the originating client may download actual content items from the targeted peers.

34 Claims, 2 Drawing Sheets

(51) Int. Cl.

| | | |
|---|---|---|
| *H04N 7/173* | (2011.01) | |
| *H04H 60/35* | (2008.01) | |
| *H04N 21/442* | (2011.01) | |
| *G06F 17/30* | (2006.01) | |
| *G11B 27/10* | (2006.01) | |
| *H04N 5/445* | (2011.01) | |
| *H04N 5/76* | (2006.01) | |
| *H04N 5/782* | (2006.01) | |
| *H04N 21/25* | (2011.01) | |
| *H04N 21/258* | (2011.01) | |
| *H04N 21/4147* | (2011.01) | |
| *H04N 21/443* | (2011.01) | |
| *H04N 21/45* | (2011.01) | |
| *H04N 21/454* | (2011.01) | |
| *H04N 21/466* | (2011.01) | |
| *H04N 21/482* | (2011.01) | |
| *H04N 21/485* | (2011.01) | |
| *H04N 21/6543* | (2011.01) | |
| *H04N 21/81* | (2011.01) | |
| *G11B 27/34* | (2006.01) | |
| *H04N 21/431* | (2011.01) | |
| *H04N 21/47* | (2011.01) | |

(52) U.S. Cl.
CPC ............... *H04N 5/76* (2013.01); *H04N 5/782* (2013.01); *H04N 7/17318* (2013.01); *H04N 21/252* (2013.01); *H04N 21/25891* (2013.01); *H04N 21/4147* (2013.01); *H04N 21/4316* (2013.01); *H04N 21/44222* (2013.01); *H04N 21/443* (2013.01); *H04N 21/4532* (2013.01); *H04N 21/454* (2013.01); *H04N 21/466* (2013.01); *H04N 21/4663* (2013.01); *H04N 21/4668* (2013.01); *H04N 21/47* (2013.01); *H04N 21/4826* (2013.01); *H04N 21/4828* (2013.01); *H04N 21/485* (2013.01); *H04N 21/6543* (2013.01); *H04N 21/812* (2013.01)

(56) References Cited

U.S. PATENT DOCUMENTS

| | | | | |
|---|---|---|---|---|
| 5,583,763 A | * | 12/1996 | Atcheson et al. | 707/750 |
| 5,758,257 A | | 5/1998 | Herz et al. | |
| 5,758,259 A | | 5/1998 | Lawler | |
| 5,790,935 A | | 8/1998 | Payton | |
| 5,812,293 A | * | 9/1998 | Yen | 398/115 |
| 5,828,843 A | * | 10/1998 | Grimm et al. | 709/228 |
| 5,835,087 A | | 11/1998 | Herz et al. | |
| 5,867,799 A | | 2/1999 | Lang et al. | |
| 5,973,683 A | | 10/1999 | Cragun et al. | |
| 5,983,214 A | | 11/1999 | Lang et al. | |
| 6,005,597 A | | 12/1999 | Barrett et al. | |
| 6,029,195 A | | 2/2000 | Herz | |
| 6,061,650 A | | 5/2000 | Malkin et al. | |
| 6,088,722 A | | 7/2000 | Herz et al. | |
| 6,092,049 A | * | 7/2000 | Chislenko et al. | 705/7.29 |
| 6,148,142 A | * | 11/2000 | Anderson | 386/206 |
| 6,177,931 B1 | | 1/2001 | Alexander et al. | |
| 6,195,654 B1 | * | 2/2001 | Wachtel | 1/1 |
| 6,249,785 B1 | | 6/2001 | Paepke | |
| 6,266,649 B1 | | 7/2001 | Linden et al. | |
| 6,317,881 B1 | | 11/2001 | Shah-Nazaroff et al. | |
| 6,438,579 B1 | | 8/2002 | Hosken | |
| 6,457,010 B1 | | 9/2002 | Eldering et al. | |
| 6,460,036 B1 | | 10/2002 | Herz | |
| 6,526,577 B1 | | 2/2003 | Knudson et al. | |
| 6,532,241 B1 | | 3/2003 | Ferguson et al. | |
| 6,591,245 B1 | * | 7/2003 | Klug | 705/7.33 |
| 6,606,624 B1 | | 8/2003 | Goldberg | |
| 6,642,939 B1 | | 11/2003 | Vallone et al. | |
| 6,675,205 B2 | | 1/2004 | Meadway et al. | |
| 6,685,479 B1 | * | 2/2004 | Ghaly | 434/236 |
| 6,813,775 B1 | * | 11/2004 | Finseth et al. | 725/46 |
| 7,065,709 B2 | | 6/2006 | Ellis et al. | |
| 7,146,627 B1 | | 12/2006 | Ismail et al. | |
| 2003/0110503 A1 | | 6/2003 | Perkes | |
| 2004/0117831 A1 | | 6/2004 | Ellis et al. | |
| 2005/0027810 A1 | | 2/2005 | Donovan | |
| 2005/0262542 A1 | | 11/2005 | DeWeese et al. | |
| 2005/0267994 A1 | * | 12/2005 | Wong et al. | 709/246 |
| 2006/0150216 A1 | | 7/2006 | Herz et al. | |
| 2006/0190966 A1 | | 8/2006 | McKissick et al. | |
| 2006/0195362 A1 | | 8/2006 | Jacobi et al. | |
| 2007/0124795 A1 | * | 5/2007 | McKissick et al. | 725/135 |
| 2011/0061076 A1 | | 3/2011 | Ali et al. | |

OTHER PUBLICATIONS

XP-000601284, GroupLens: An Open Architecture for Collaborative Filtering of Netnews, 1994.

Metabyte, "Metabye Announces Personalized TV Software" Metabyte Networks, Inc., Press Release, XP-002154116, written Jan. 21, 1999, 1 page.

TIVO, "TIVO Brings Home HBO Through Agreement Benefiting Personal Television Service Users," press release, XP-002154115, written Jan. 28, 1999, 2 pages.

Caro, M., "Gene Siskel: A Man of Influence," The UK Critic, Feb. 22, 1999, located on the internet at http://www.ukcritic.com, retrieved on Jan. 19, 2007, 5 pages.

Sheth, B., "A Learning Approach to Personalized Information Filtering" submitted to the Department of Electrical Engineering and Computer Science on Jan. 14, 1994, 72 pages.

* cited by examiner

INTELLIGENT PEER-TO-PEER SYSTEM AND METHOD FOR COLLABORATIVE SUGGESTIONS AND PROPAGATION OF MEDIA

CROSS-REFERENCE TO RELATED APPLICATIONS; BENEFIT CLAIM

This application claims the benefit as a Continuation of application Ser. No. 10/168,782, filed Jun. 21, 2002 the entire contents of which is hereby incorporated by reference as if fully set forth herein, under 35 U.S.C. §120; which claims priority to PCT/US00/35035 filed Dec. 21, 2000, which claims priority to provisional application No. 60/171,829 filed Dec. 21, 1999 and provisional application No. 60/226,856 filed Aug. 22, 2000, to which provisional applications this application further claims benefit under 35 U.S.C. §119 (e) The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

1. Field of the Invention

The present invention relates to automated systems and methods for recommending items to users. More particularly, the invention relates to an automated peer-to-peer system and method for collaborative suggestions and propagation of media.

2. Description of Related Art

The prior art provides various systems for filtering, suggesting and rating of media content items. Common methods of suggesting and rating items occasionally employ collaborative filtering techniques, in which a user's preference profile is compared with profiles of similar users or groups of users. The co-pending application, K. Ali, W. Van Stam, "Intelligent system and methods of recommending media content items based on user preferences," PCT Patent Application No. PCT/US00/33876 (Dec. 14, 2000) discusses several of these collaborative filtering implementations. In addition, J. Atcheson, J. Miller, "Method and apparatus for recommending selections based on preferences in a multi-user system," U.S. Pat. No. 5,583,763 (Dec. 10, 1996) describe a system for determining selections that a user is likely to be interested in. A determination is made, based on a user's prior indicated preferences, designated in a preferences list. The list is compared with other users' lists. When a large number of matches is found between two lists, the unmatched entries of the other user's list are extracted. Typically, these implementations require a client-server network environment and a stateful connection between the client and the server. Correlations are calculated on the server, based on data periodically supplied by the client, necessitating monitoring of the client state, thereby raising confidentiality concerns. It would be desirable to provide a collaborative suggestion system in which a stateful connection between client and server is unnecessary, thus reducing concerns about user privacy.

The above-identified co-pending application, K. Ali, et al., supra, describes a distributed collaborative filtering engine that guarantees user privacy by eliminating the necessity of correlating the user to other user's or groups of users. Similarity is calculated on the client side, eliminating the necessity of a stateful connection between the server and the client. The described system, however, employs a client-server architecture in which information is exchanged only between client and server. It would be an advantage to provide a system for collaborative suggestion in a peer-to-peer environment, which makes opportunistic use of an existing network connection, wherein peers evaluate their similarity to one another.

Peer-to-peer file sharing systems are becoming increasingly common. For example, the "Gnutella Support Pages," http://gnutella.wego.com (no date) describe a peer-to-peer network composed of a multiplicity of Gnutella clients, in which the client software includes an integrated search engine and file server. The Gnutella network changes constantly, according to the number of Gnutella clients that are on the network at any given time. No server exists, and the network infrastructure is provided by a publicly accessible network, such as the Internet. In order to access the Gnutella network, a user must have the network address of at least one other Gnutella client that is currently connected. A user in search of a particular information object, a digital music file, or a recipe, for example, may send a query over the network. The query is passed from client to client until the object is located or the query is terminated. While the Gnutella client allows the creation of a dynamic peer-to-peer network, and sharing of files between clients, the query process is user-initiated: queries are formulated and launched by the user with no automation of the query process. Additionally, the Gnutella network is primarily directed to file sharing, in which media content items are shared or propagated between users. There is no capability of comparing user profiles between clients in order to generate collaborative suggestions. Furthermore, the Gnutella network is concerned exclusively with the peer-to-peer network paradigm.

It would be a technological advance to provide a system for collaborative suggestions and media propagation that did not require a stateful connection between a client and server, thus safeguarding privacy of individual users. It would be a great advantage to implement such a system as a peer-to-peer based system that was capable of operating in parallel with client-server based suggestion systems, opportunistically employing the same network connection, wherein suggestions generated by both systems are presented in the same software interface. Furthermore, it would be desirable to automate the peer-to-peer system, so that clients could initiate and carry out interactions with each other without direction or intervention by a user.

SUMMARY OF THE INVENTION

A network-based intelligent system for predicting ratings for items of media content according to how likely they are to appeal to a user provides a parallel, peer-to-peer system and method for collaborative suggestions and propagation of media. Using a typical client-server architecture, clients contact a server on a periodic basis, independent of the user. In addition to client-server interaction, clients also make opportunistic use of the network connection to interact with one another in peer-to-peer fashion. The server organizes clients into groups and provides each client within a group with the network address of all other clients in the group. An originating client queries a targeted peer by transmitting a list indicative of its user's preferences. The targeted peer evaluates the similarity of the transmitted list with a list of its own. If the two clients are sufficiently similar, the comparison continues in an interactive fashion. After the initial determination by the targeted peer, the exchange of information proceeds in a stepwise manner, with the originating client evaluating similarity at each stage. If the two clients are dissimilar, either the originating client or the targeted peer may terminate the query, depending on the stage of the interaction; or the targeted peer may route the query to a second targeted peer. The interaction culminates in the originating client downloading content listings from the targeted peer to generate suggestions for their user. In addition to the lists of preferences, the originating client may download actual content items from the targeted peers.

DETAILED DESCRIPTION

Figure 1:
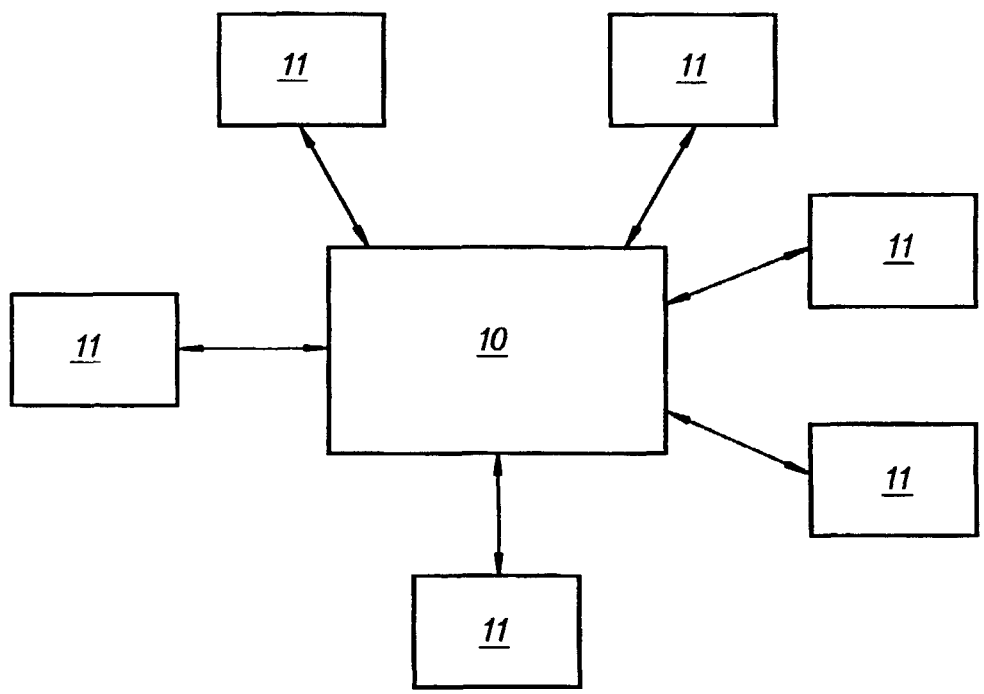
FIG. 1 provides a block diagram of a network-based video recording system, according to the invention.
Figure 2:
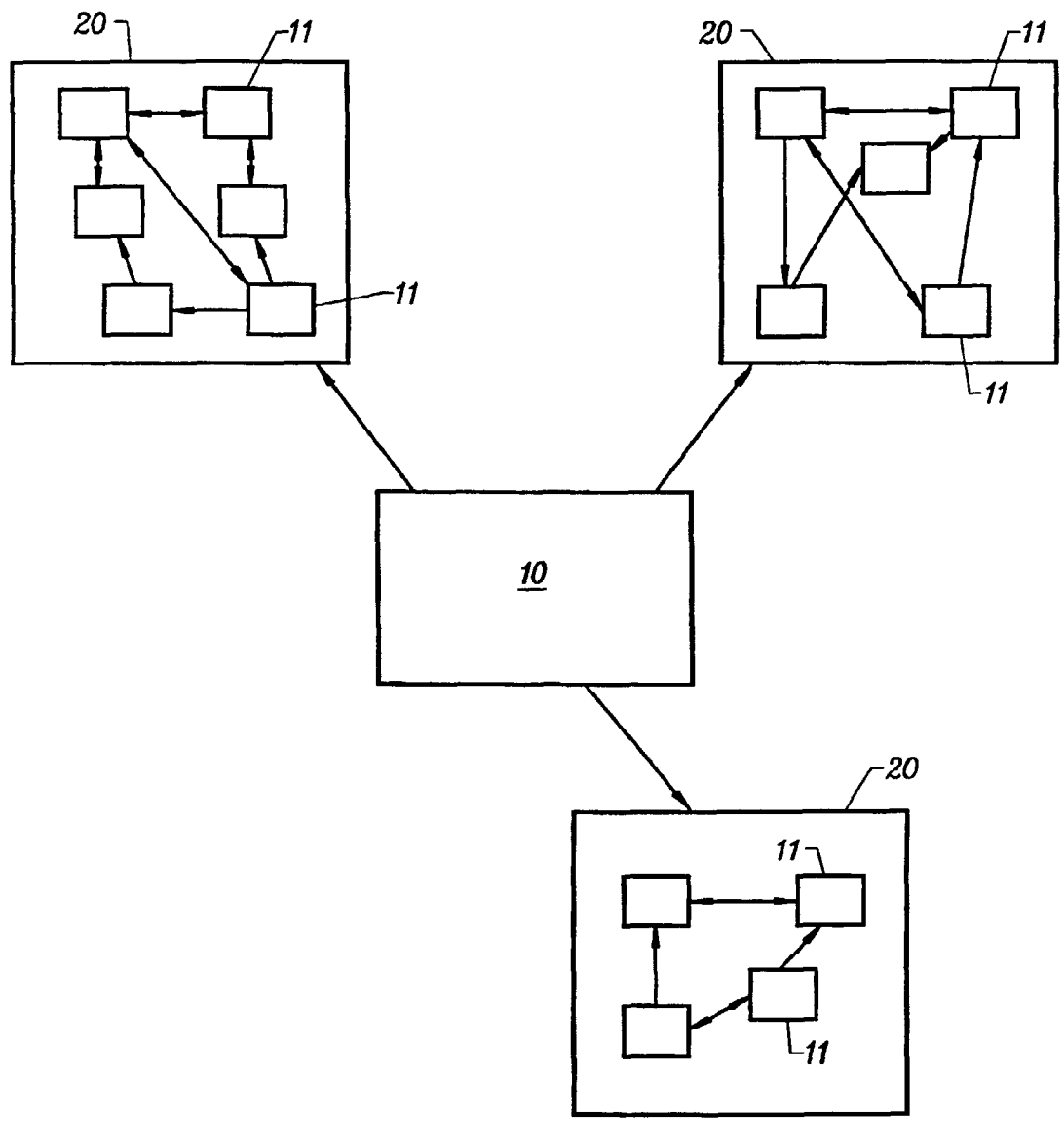
FIG. 2 provides a block diagram illustrating peer-to-peer interaction among the clients of the system of FIG. 1, according to the invention.

The co-pending application, K. Ali, et al., supra, provides an intelligent, distributed system for recommending items of content to a user, based on the user's expressed preferences. The described system, shown here in FIG. 1, employs a client-server network architecture in which each of a plurality of clients is periodically in contact with the server. In the described system, all interaction occurs between the client 11 and the server 10, as FIG. 1 shows. However, the current invention extends the suggestion generating capability of the previous system by making opportunistic use of the network connection to provide peer-to-peer interaction among the clients, so that the knowledge embodied on each of the clients is further leveraged by exchanging suggestions and content directly between clients, in peer-to-peer fashion. In the parallel peer-to-peer system, shown in FIG. 2, the server 10 is operative to organize simultaneously connected clients 11 into one or more groups 20, whereupon the server provides each client within a group 20 the network address of all other clients in the same group. Beyond this initial function, all interaction occurs among the clients, independently of the server, in parallel with the client-server interaction. In the system of the parent application, the client is in contact with the server for a short period of time to download current program guide data and to exchange data with the server for the purpose of generating collaborative suggestions. Since the time of connection varies from day-to-day, in a large community of users, the selection of clients connected to the network at any given time is apt to be fairly random, so that, over time, each client is randomly exposed to a large population of other clients, thereby enabling a rich exchange of information.

While the preferred embodiment of the invention employs the Internet as its network infrastructure, other publicly accessible telecommunications networks would also be suitable: for example, a cable television network. The presently preferred embodiment of the invention employs a dial up network connection. However, hardwired connections, for example, coaxial or fiber optic cable would also be suitable, particularly in the case of broadband implementations of the invention. Furthermore, wireless connections would also be consistent with the spirit and scope of the invention. The type of media involved is highly variable. While the present embodiment of the invention is concerned primarily with various types of television programming, the invention also finds application with text files, web sites, books, digital music; in short, almost any type of digital media.

Communication occurs directly between the clients, in a manner that is difficult to trace or monitor. Furthermore, network addresses are dynamically assigned, and are valid only for the duration of the connection. Thus, the temporary and anonymous nature of the peer-to-peer interaction provides an important safeguard to user privacy.

During their interaction, two clients go through an interactive comparison procedure, in which they compare information that is highly indicative of their respective user's interests. At each step of the procedure, correlation, or similarity is calculated. If the correlations converge, the originating client may request user preference lists from the target peer. If such a convergence isn't reached or the correlation is deemed too low, then the query can be terminated or relayed to a second targeted peer. Various embodiments of the method of interaction between peers are described below.

Peer-to-Peer Suggestion System

In the invented system, a pool of client devices is simultaneously connected to a network. The presently preferred embodiment of the invention incorporates clients of a distributed personal video recording system, in which every client is a dedicated video recording unit. Resident on every client are several lists that are highly indicative of a user's preferences. Minimally, the lists include:

Lists of recorded items that are currently available for viewing;

Lists of various types of items to record (single programs, series, programs of a particular subject or type, programs having a particular actor, and so on); and Lists of rated items.

I. Peer-to-Peer Interconnection

As previously indicated, clients connect to a central server periodically. In a larger community of users, there is a constant group of clients connected to the server, dynamic in nature, in which clients constantly come and go.

The server organizes clients by connection time, so that clients that have connected recently are all placed in the same group; additionally, the server controls group size. A larger group size is preferable in order to maximize the opportunity for interaction among clients. The server provides each client in the group network with network addresses to all other clients in the group. Following group formation, each client is free to contact any other client in the group directly.

II. Peer-to-Peer Interaction

The lists mentioned above may be hundreds or even thousands of items in length. Thus, exchanging an entire list or set of lists between clients may be impractical, particularly in the case of a narrowband dial up network connection. Therefore, a variety of methods have been provided to facilitate peer-to-peer interaction in a manner that economizes on time and network resources.

Method 1: Small Lists Having Dense Meaning.

Each client has one or more compact lists of items that are highly representative of the user's preferences. These may be the list of series to record, or the list of items currently available. Each of them armed with such a list, an originating client (A) and targeted client (B) interact as follows:

Client A sends a query to B, consisting of the list, and the size of the other lists it has to exchange.

Client B receives the query and compares A's list with its own corresponding list to determine the number of elements it shares in the list with client A. It now computes the similarity between A and B, according to an algorithm, resident on both A and B, in which:

Similarity=Number of elements in common between A and B/number of elements reported by A. Similarity is expressed as a value in a range of approximately 0 to 1. Client B may respond in one of several ways:

If the similarity value is less than a first predetermined threshold, it can respond to A that B has nothing that A might be interested in.

If the similarity value exceeds the predetermined threshold, B can respond that A should be interested in B. In addition, B sends more information with the response that indicates relative sizes of B's lists, compared to A's. For example, B might say "Yes, you are 80% interested in me, and I have twice the number of ratings data that you have, and a third your size of recording history". Client A's response is described further below.

If the similarity value is less than the predetermined threshold, B may pass the query from A to a second targeted peer. Upon redirecting, a reference to B is appended to the query so that successive peers know not to pass the query to B. It also allows A to know which clients have evaluated its query when it receives a response. In any further queries originated by A, it will then skip over those that have already been queried.

If Client A receives a positive response from a targeted peer, comprising similarity values, relative list sizes and a listing of peers that have evaluated the query, further interaction is determined by A. If A determines that the similarity value is less than a second predetermined threshold, A terminates the query. Having terminated the query, A may direct additional queries to other clients within the group that have not yet been queried. If the similarity value exceeds the second threshold, client A evaluates which lists it wants to retrieve from the responding peers. If the relative size of any of the other lists is sufficient, A may request the complete list from the responding peer. For example, A may request a full recording history from one respondent and a complete list of ratings from another. Upon receiving the lists, A further evaluates the lists for correlation, and uses them to generate collaborative suggestions for the user. Appropriate methods for computing correlation and generating collaborative suggestions are described in the co-pending application previously mentioned, K. Ali, et al., supra.

Method 2: Iterative Disclosure.

The previous method assumed that sending a full list of items can be done in small packets that travel easily over the connecting network. When the lists are large, like the recording history, or the ratings list, this method is inefficient. An alternate approach is the sharing of the lists in successive blocks, in iterative fashion. In the following description, as above, Client A is the originator and Client B is the target:

Client A takes a block that includes the first n consecutive items in it's list and transmits it to B.

B receives the list and determines matching items; and transmits a list of matching items to A.

A creates a temporary matching items list, where it saves the list received from B, and transmits another block of n items to B. B responds with another list of matching items, which A adds to its temporary list. With each succeeding response from B, A evaluates what portion of the total number of items shared with B the two peers have in common. When enough items have been tested by repeating the above steps, the ratio remains relatively constant from one iteration to the next. At that point, the similarity value for the partial data is representative of the similarity value for the entire list. The query then proceeds as described above, in which A requests from the target the lists it wishes to receive.

Method 3: Iterative Disclosure of Ratings
Similar to the previous method:

Again, A Sends partial lists to B, and B echoes back what it has. Meanwhile A and B keep track of what they share. In addition, the lists that A sends to B contain A's ratings of the items, and B's answers contain B's ratings of the items matching items. Thus, both A and B maintain a list of items, with both A's and B's ratings. This allows A and B to use standard correlation math to determine how well A and B. As the size of the list of items they have in common grows, the correlation factors will tend to mirror the real correlation factor that would be obtained if all available data was known to both A and B.

According to a minimum confidence requirement standard (based on the number of items shared from A, and number of items that are shared) the process is repeated until the standard is satisfied. After that, A and B can determine if the correlation is high enough to proceed with sharing full lists or to terminate the connection, in the event of an insufficient correlation.

Those skilled in the art will recognize that the roles of originator and target have been employed for purposes of description. In actual fact, each client within a group is both an originator and a target, wherein each client directs queries to other clients and receives queries from other clients. Furthermore, while the client-server system of the copending application and the present peer-to-peer system have been treated as parallel systems for the sake of description, the skilled practitioner will appreciate that they are, in fact, one system having parallel functionalities. Thus, the client units interact with the server in the usual client-server fashion, and simultaneously also have the peer-to-peer functionality herein described. The invention is implemented using conventional techniques well known to those skilled in the art of software engineering and computer programming. The network implementation will be apparent to those skilled in the design and administration of data networks.

While a narrow band dial up connection renders the transmission between clients of large media files impractical, broadband implementations of the invention, wherein connection is by means of fiber optic or coaxial cable, DSL, T1 or T3, or the like, enable the peer-to-peer sharing of the underlying content, as well as the user preference files.

Although the invention has been described herein with reference to certain preferred embodiments, one skilled in the art will readily appreciate that other applications may be substituted without departing from the spirit and scope of the present invention. Accordingly, the invention should only be limited by the Claims included below.

What is claimed is:

1. A method comprising:

sharing, between client devices in a group of client devices, preference data of users associated with the group of client devices, the preference data including a first subset of the shared preference data, the first subset received by a first client device in the group of client devices from one or more other client devices in the group of client devices;

comparing, by the first client device, the first subset of the shared preference data to first preference data of the first client device;

based at least upon the comparing, identifying, by the first client device, a second client device in the group of client devices for which suggestions are to be generated;

based on comparing the first preference data of the first client device to second preference data of the second client device, identifying one or more suggested items for the second client device.

2. The method of claim 1, wherein the first client device and the second client device are different media devices.

3. The method of claim 1, further comprising:
estimating similarity between the first client device and the second client device by comparing, at the first client device, the second preference data to the first preference data;
based on the comparing, determining whether the first client device is to suggest items to the second client device by determining whether the second client device is similar to the first client device;
responsive to determining that the second client device is similar to the first client device, the first client device providing the one or more suggested items to the second client device.

4. The method of claim 1, further comprising the second client device transmitting the second preference data to the first client device based on grouping data specifying that the first client device belongs to the group of client devices.

5. The method of claim 1, further comprising:
receiving, at a third client device, the second preference data of the second client device;
comparing, at the third client device, the second preference data to third preference data of the third client device;
based on the comparing, determining, at the third client device, whether the third client device is not similar to the second client device;
based on determining that the third client device is not similar to the second client device, and further based on grouping data specifying that the first client device belongs to the group of client devices, the third client device sending the second preference data to the first client device.

6. The method of claim 3, wherein the sharing, comparing, and determining of whether the second client device is similar to the first client device are repeated iteratively with different portions of the second preference data until a minimum confidence that the second client device is similar to the first client device is satisfied.

7. The method of claim 1, further comprising the first client device and the second client device receiving grouping data from a central server identifying the client devices in the group of client devices.

8. The method of claim 1, wherein the preference data and the one or more suggested items comprise one or more of: a list of media items stored on a given client device of the first client device and the second client device; a list of media items desired by a given user of the given client device; or a list of media items rated by the given user of the given client device.

9. The method of claim 1, further comprising:
receiving, at the second client device, a similarity score measuring similarity between the first preference data of the first client device and the second preference data of the second client device;
based on the similarity score, the second client device requesting that the first client device identify the one or more suggested items;
wherein the first client device identifies the one or more suggested items for the second client device responsive to the request from the second client device.

10. The method of claim 1, further comprising:
prior to the first client device identifying the one or more suggested items, the first client device receiving first grouping data indicating that the first client device and the second client device are in a first group of client devices, the first group of client devices being the group of client devices;
the first client device sharing the first preference data with the client devices in the first group of client devices based on the first grouping data;
after the first client device identifies the one or more suggested items, the first client device receiving second grouping data indicating that the first client device is in a second group of client devices that does not include the second client device;
based on the second grouping data, sharing, between client devices in the second group of client devices, preference data of users associated with the second group of client devices;
based upon the preference data of users associated with the second group of client devices, the first client device identifying one or more suggested items for a third client device in the second group of client devices.

11. The method of claim 1, further comprising:
causing the first client device to send to the second client device playable contents of the one or more suggested items.

12. The method of claim 11, further comprising the second client device requesting to download the one or more suggested items from the first client device.

13. A system comprising one or more computing devices configured to cause performance of:
sharing, between client devices in a group of client devices, preference data of users associated with the group of client devices, the preference data including a first subset of the shared preference data, the first subset received by a first client device in the group of client devices from one or more other client devices in the group of client devices;
comparing, by the first client device, the first subset of the shared preference data to first preference data of the first client device;
based at least upon the comparing, identifying, by the first client device, a second client device in the group of client devices for which suggestions are to be generated;
based on comparing the first preference data of the first client device to second preference data of the second client device, identifying one or more suggested items for the second client device.

14. The system of claim 13, wherein the first client device and the second client device are different media devices.

15. The system of claim 13, wherein the one or more computing devices are further configured to cause performance of:
estimating similarity between the first client device and the second client device by comparing, at the first client device, the second preference data to the first preference data;
based on the comparing, determining whether the first client device is to suggest items to the second client device by determining whether the second client device is similar to the first client device;
responsive to determining that the second client device is similar to the first client device, the first client device providing the one or more suggested items to the second client device.

16. The system of claim 13, wherein the one or more computing devices are further configured to cause performance of the second client device transmitting the second preference data to the first client device based on grouping data specifying that the first client device belongs to the group of client devices.

17. The system of claim 13, wherein the one or more computing devices are further configured to cause performance of:
receiving, at a third client device, the second preference data of the second client device;
comparing, at the third client device, the second preference data to third preference data of the third client device;
based on the comparing, determining, at the third client device, whether the third client device is not similar to the second client device;
based on determining that the third client device is not similar to the second client device, and further based on grouping data specifying that the first client device belongs to the group of client devices, the third client device sending the second preference data to the first client device.

18. The system of claim 15, wherein the sharing, comparing, and determining of whether the second client device is similar to the first client device are repeated iteratively with different portions of the second preference data until a minimum confidence that the second client device is similar to the first client device is satisfied.

19. The system of claim 13, wherein the one or more computing devices are further configured to cause performance of the first client device and the second client device receiving grouping data from a central server identifying the client devices in the group of client devices.

20. The system of claim 13, wherein the preference data and the one or more suggested items comprise one or more of: a list of media items stored on a given client device of the first client device and the second client device; a list of media items desired by a given user of the given client device; or a list of media items rated by the given user of the given client device.

21. The system of claim 13, wherein the one or more computing devices are further configured to cause performance of:
receiving, at the second client device, a similarity score measuring similarity between the first preference data of the first client device and the second preference data of the second client device;
based on the similarity score, the second client device requesting that the first client device identify the one or more suggested items;
wherein the first client device identifies the one or more suggested items for the second client device responsive to the request from the second client device.

22. The system of claim 13, wherein the one or more computing devices are further configured to cause performance of:
prior to the first client device identifying the one or more suggested items, the first client device receiving first grouping data indicating that the first client device and the second client device are in a first group of client devices, the first group of client devices being the group of client devices;
the first client device sharing the first preference data with the client devices in the first group of client devices based on the first grouping data;
after the first client device identifies the one or more suggested items, the first client device receiving second grouping data indicating that the first client device is in a second group of client devices that does not include the second client device;
based on the second grouping data, sharing, between client devices in the second group of client devices, preference data of users associated with the second group of client devices;
based upon the preference data of users associated with the second group of client devices, the first client device identifying one or more suggested items for a third client device in the second group of client devices.

23. One or more non-transitory computer-readable media storing instructions that, when executed by one or more computing devices, cause performance of:
sharing, between client devices in a group of client devices, preference data of users associated with the group of client devices, the preference data including a first subset of the shared preference data, the first subset received by a first client device in the group of client devices from one or more other client devices in the group of client devices;
comparing, by the first client device, the first subset of the shared preference data to first preference data of the first client device;
based at least upon the comparing, identifying, by the first client device, a second client device in the group of client devices for which suggestions are to be generated;
based on comparing the first preference data of the first client device to second preference data of the second client device, identifying one or more suggested items for the second client device.

24. The one or more non-transitory computer-readable media of claim 23, wherein the instructions, when executed by the one or more computing devices, further cause performance of:
causing the first client device to send to the second client device playable contents of the one or more suggested items.

25. The one or more non-transitory computer-readable media of claim 23, wherein the instructions, when executed by the one or more computing devices, further cause performance of the second client device requesting to download the one or more suggested media items from the first client device.

26. The one or more non-transitory computer-readable media of claim 23, wherein the first client device and the second client device are different media devices.

27. The one or more non-transitory computer-readable media of claim 23, wherein the instructions, when executed by the one or more computing devices, further cause performance of:
estimating similarity between the first client device and the second client device by comparing, at the first client device, the second preference data to the first preference data;
based on the comparing, determining whether the first client device is to suggest items to the second client device by determining whether the second client device is similar to the first client device;
responsive to determining that the second client device is similar to the first client device, the first client device providing the one or more suggested items to the second client device.

28. The one or more non-transitory computer-readable media of claim 27, wherein the sharing, comparing, and determining of whether the second client device is similar to the first client device are repeated iteratively with different portions of the second preference data until a minimum confidence that the second client device is similar to the first client device is satisfied.

29. The one or more non-transitory computer-readable media of claim 23, wherein the instructions, when executed by the one or more computing devices, further cause performance of the second client device transmitting the second preference data to the first client device based on grouping data specifying that the first client device belongs to the group of client devices.

30. The one or more non-transitory computer-readable media of claim 23, wherein the instructions, when executed by the one or more computing devices, further cause performance of:
   receiving, at a third client device, the second preference data of the second client device;
   comparing, at the third client device, the second preference data to third preference data of the third client device;
   based on the comparing, determining, at the third client device, whether the third client device is not similar to the second client device;
   based on determining that the third client device is not similar to the second client device, and further based on grouping data specifying that the first client device belongs to the group of client devices, the third client device sending the second preference data to the first client device.

31. The one or more non-transitory computer-readable media of claim 23, wherein the instructions, when executed by the one or more computing devices, further cause performance of the first client device and the second client device receiving grouping data from a central server identifying the client devices in the group of client devices.

32. The one or more non-transitory computer-readable media of claim 23, wherein the preference data and the one or more suggested items comprise one or more of: a list of media items stored on a given client device of the first client device and the second client device; a list of media items desired by a given user of the given client device; or a list of media items rated by the given user of the given client device.

33. The one or more non-transitory computer-readable media of claim 23, wherein the instructions, when executed by the one or more computing devices, further cause performance of:
   receiving, at the second client device, a similarity score measuring similarity between the first preference data of the first client device and the second preference data of the second client device;
   based on the similarity score, the second client device requesting that the first client device identify the one or more suggested items;
   wherein the first client device identifies the one or more suggested items for the second client device responsive to the request from the second client device.

34. The one or more non-transitory computer-readable media of claim 23, wherein the instructions, when executed by the one or more computing devices, further cause performance of:
   prior to the first client device identifying the one or more suggested items, the first client device receiving first grouping data indicating that the first client device and the second client device are in a first group of client devices, the first group of client devices being the group of client devices;
   the first client device sharing the first preference data with the client devices in the first group of client devices based on the first grouping data;
   after the first client device identifies the one or more suggested items, the first client device receiving second grouping data indicating that the first client device is in a second group of client devices that does not include the second client device;
   based on the second grouping data, sharing, between client devices in the second group of client devices, preference data of users associated with the second group of client devices;
   based upon the preference data of users associated with the second group of client devices, the first client device identifying one or more suggested items for a third client device in the second group of client devices.

\* \* \* \* \*